(No Model.)
W. LOUDEN.
HAY SLING.
No. 444,546. Patented Jan. 13, 1891.
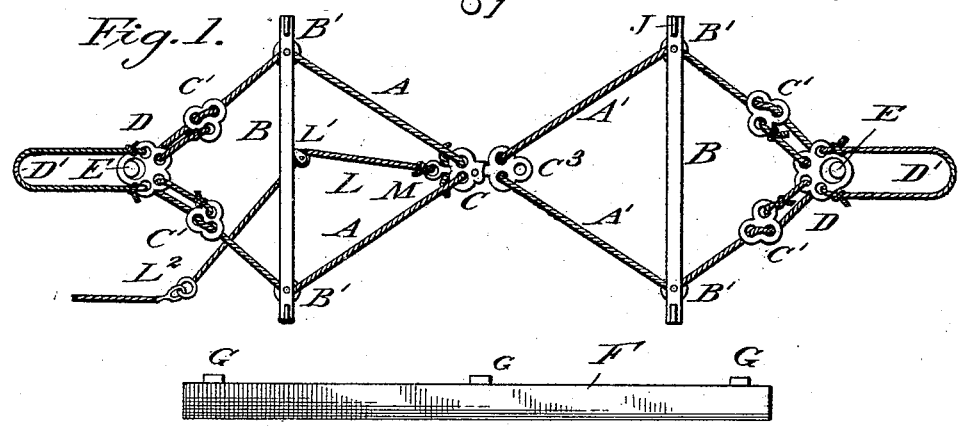
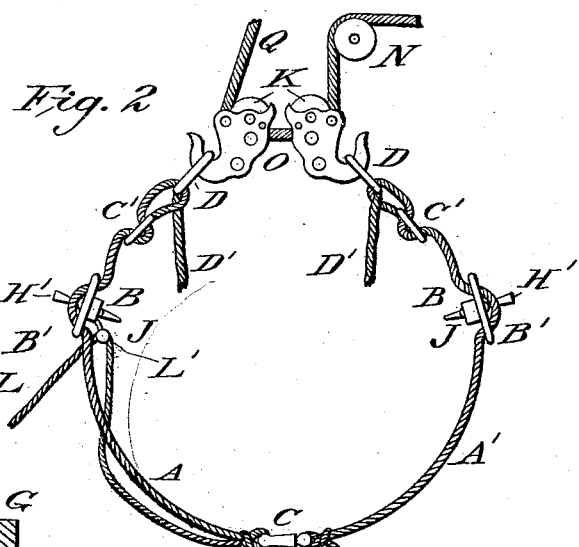
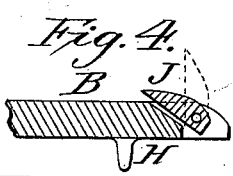
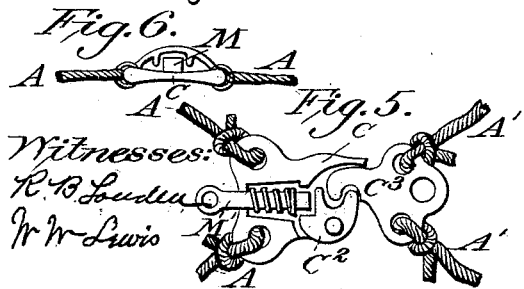
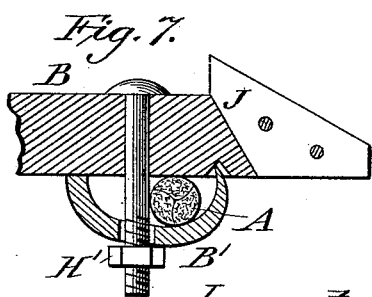
Witnesses:
R. B. Louden
W. W. Lewis
Inventor:
William Louden

UNITED STATES PATENT OFFICE.

WILLIAM LOUDEN, OF FAIRFIELD, IOWA.

HAY-SLING.

SPECIFICATION forming part of Letters Patent No. 444,546, dated January 13, 1891.

Application filed March 9, 1888. Serial No. 266,766. (No model.)

*To all whom it may concern:*

Be it known that I, WILLIAM LOUDEN, a citizen of the United States, residing at Fairfield, in the county of Jefferson and State of Iowa, have invented certain new and useful Improvements in Hay-Slings, of which the following is a description.

The object of my invention is to produce a hay-sling that can be readily adjusted to suit different sizes and lengths of loads, that can be readily adapted to handle various kinds of hay, straw, or fodder, and that can be loaded by sliding the forage upon it as well as by building the load upon it; and I do hereby declare the following to be a full, clear, and exact description of the invention, reference being had to the accompanying drawings, which form a part of this specification, in which—

Figure 1 is a plan or top view showing the sling ready to receive its load. Fig. 2 is a side sectional view drawn along the line of the ropes A and A' on one side of the sling and showing it in the position of being elevated with its load. Fig. 3 is a cross-sectional view of the approach F, showing its position in use. Fig. 4 is a sectional view of the end of one of the spreaders B, showing details of construction. Fig. 5 is a top view of the trip-coupling C, with the upper casing removed to show the working parts. Fig. 6 is a cross-section of the trip-coupling C, drawn along the line of the rope A A and through the main castings between them. Fig. 7 is a sectional view of the end of one of the spreaders B, showing the attachment of a rigid barb or shoulder J and the adjustable clamp B'.

A and A' represent two sets of ropes, which are connected together by a trip-coupling C. Each set of ropes is provided with a spreader B to hold the ropes apart, and the outer or free ends of the ropes are secured to a ring D for the attachment of the hoisting-tackle and to hold the sling in position to receive its load when the hay is drawn upon it by a rake or other similar means. The ropes A and A' are also provided with adjustable clamps C'. The ends of the ropes are first passed through these clamps, then through the ring D, and then back to the clamps C', where they are secured. By this means the ropes can readily be lengthened or shortened by slipping the clamps back or forth along the ropes, and they will clamp and hold the ropes at any point. The precise construction of the clamps C' is not essential so long as they can be readily slipped back or forth along the ropes, and will automatically hold the ropes where they are placed until they are released by the operator.

The ropes are adjustably secured to the spreaders B by means of metal clamps B', which are bolted to the under sides of the spreaders. These clamps may be made in the general form of the clamps C', so as to hold the rope by kinking it, as shown at B' in Fig. 2, or they may be made as shown in Fig. 7, in which case the rope is held against the side of the spreader by the pressure of the bolt on the clamp. In either case the spreaders are easily adjusted along the ropes and also easily removed or replaced in case of breakage or in changing the number or size of the spreaders without having to take apart or disarrange any of the balance of the sling.

By means of the adjustable clamps C' and B' the sling can be readily adjusted in length and changed in shape without having to take off or put on any of the parts. There are no loose pieces to drop out and get lost in making adjustments, as there are when wedges or other similar devices are used. Additional spreaders may be put on or taken off without having to disconnect the ropes from the attaching-rings D, which has to be done when the ropes pass through holes in the spreaders. When the sling is shortened up for handling small loads, the clamps C' hold the ends of the ropes from dangling around and getting in the way, and there is no danger of the rings D becoming detached from the sling, as there is when open hooks are used. The adjustments can be made at any desired point within their maximum limits and to correct the stretching or shrinking of the ropes, so that the sling may always be held tightly stretched between the pins E E.

This sling is adapted to be loaded either by building the hay upon it in the usual way or by sliding the hay over it by means of a rake or any suitable hay-sliding device. When thus used, the sling is held in position to receive the load by looping the rings D D over pins or stakes E E, and an approach F is constructed in front of the sling to assist in conducting the hay over it. This approach is usually constructed of a board or a timber slightly elevated above the level of the ground, and inclined, as shown in Fig. 3, to afford an easy passage of the hay over the sling. When a board is used for the approach, it may be blocked up by pieces G to give it the proper elevation, and it should be anchored to prevent the moving load from pushing it away from its position.

To further assist in holding the sling in its place while receiving its load a number of pins H are secured to the spreaders, so as to project downward from the under side of the spreaders and engage the ground or platform on which the sling is laid, as shown in Fig. 4. In place of these pins, or some of them, the bolts holding the clamps B' may be utilized by allowing their points H' to extend sufficiently downward, as shown in Fig. 7.

In order to prevent the hay from being drawn too far over the sling and thus load it unevenly, I form stops J on the top side of the spreaders close to each end. These stops may be made in the form of a pivoted barb, as shown in Fig. 4, or in the form of a rigid shoulder, as shown in Fig. 7; but in both cases the sloping side of the stop must be set toward the end of the spreader to which it is attached, and the hooked or holding side toward the center of the spreader, so that the stop will offer little or no resistance to the passage of the hay onto the sling, but will prevent it from passing off the ends of the spreaders. By placing these barbs or shoulders on both ends of the spreaders the sling may be laid with either side next to the hay, and the barbs or shoulders at the rear side of the sling only will act as stops to hold the hay. To further assist in holding the hay from being drawn too far over the sling, a stake or pin I set in the ground, or other suitable stopping device, may be used. The hay being loaded on the sling, it will likely be found that one or both of the attaching-rings D will be covered more or less with the hay, which usually projects past the ends of a rake in drawing it in. If the sling were made long enough to be outside of this hay, it would likely be too long when rolled up with the hoisting-tackle, as shown in Fig. 2, to bind and hold its load securely. To overcome the difficulty here presented, I attach one or more supplemental ropes D' to the sling, by which the ends can be drawn up from under the hay by the operator and connected to the pulleys K of the hoisting-tackle. Even when the sling is used in the ordinary way and the hay is built upon it these supplemental ropes are necessary, for it is generally desirable to have the length of the sling between the rings D as short as possible in order to bind the load thoroughly in elevating, and thus hold it securely. These supplemental ropes can be attached in the form of a loop, as shown in Fig. 1, or one of the ends can be left loose, as shown in Fig. 2, which I consider the preferable plan. They are not intended to constitute any part of the sling proper or to be used for binding or "pursing" the sling with the elevating-tackle, but simply to enable the operator to draw the attaching-rings D up from under the hay, and thus facilitate the attachment of the elevating-tackle. The attaching-rings D can be made in any form desired; but it is preferable to construct them with a series of eyes for attachment of the ropes, as shown in Fig. 1, thus leaving the main parts of the rings free to loop over the stakes E or to attach to the pulleys K. The ends of the sling being attached to the pulleys K, the application of power to the hoisting-rope O, which passes over the pulley N, will roll the sling up, as shown in Fig. 2, and hold the hay securely within it. When elevated to the proper point of deposit, a pull on the trip-cord L, connected to the trip-bolt M, will free the grip-hook $C^2$, and it in turn will release the coupling-hook $C^3$. This will allow the parts A and A' of the sling to separate and the hay will drop out between them. To connect the sling together again, press the coupling-hook $C^3$ into the recess of the grip-hook $C^2$ until it revolves sufficiently to allow the trip-bolt M to drop or be forced by a spring behind the shoulder on the grip-hook $C^2$ and lock it, as shown in Fig. 5.

The form of the trip-coupling C is well adapted for a sling to be loaded by sliding the hay upon it. The upper part of the casing is made rounding, as shown in Fig. 6, and when locked the working parts, including the connecting end of coupling-hook $C^3$, are all entirely within the casing of the coupling, where the moving hay cannot disturb them. The only exposed parts are the eyes for the attachment of the ropes, and these are placed close to the bottom.

To keep the trip-cord in line with the trip-bolt M, it is passed through a guiding-pulley L', which is attached to one of the spreaders, as shown in Fig. 1. The trip-cord may have a coupling, as shown at $L^2$, so that the outer part of the trip-cord may be connected and disconnected from a different sling when necessary.

Having thus described my invention, what I claim as new, and desire to secure by Letters Patent, is—

1. A hay-sling composed, principally, of ropes and spreaders, in combination with barbs or shoulders attached to the spreaders, substantially as shown and described.

2. A hay-sling composed, principally, of ropes and spreaders and adapted to be loaded by sliding the hay upon it, in combination with pins attached to the spreaders, substantially as and for the purpose set forth.

3. In a hay-sling composed, principally, of ropes, the trip-coupling C, composed of a suitably-recessed casing provided with eyes for the attachment of the ropes and containing the grip-hook $C^2$ and trip-bolt M, in combination with the coupling-hook $C^3$, also provided with eyes for the attachment of the ropes, and the hooked end being adapted to enter the recess in the casing and engage the grip-hook $C^2$, substantially as set forth.

4. A hay-sling composed of the ropes A and A', trip-coupling C, spreaders B, adjustable clamps C' and B', and attaching-rings D, substantially as shown.

5. A hay-sling composed of the ropes A and A', trip-coupling C, spreaders B, adjustable clamps B' and C', attaching-rings D, and the extension-ropes D', substantially as shown and set forth.

In testimony whereof I affix my signature in the presence of two witnesses.

WILLIAM LOUDEN.

Witnesses:
H. B. KELTNER,
F. B. TAYLOR.